(12) United States Patent
Hattiangadi et al.

(10) Patent No.: US 11,608,760 B2
(45) Date of Patent: Mar. 21, 2023

(54) STEM SEAL FOR VALVE ASSEMBLY OF MACHINE ENGINE

(71) Applicant: Caterpillar Inc., Peoria, IL (US)

(72) Inventors: Ashwin A. Hattiangadi, Edwards, IL (US); Selvaganapathi Ganesan, Tamilnadu (IN); Jakub M. Walczak, Lafayette, IN (US)

(73) Assignee: Caterpillar Inc., Peoria, IL (US)

( * ) Notice: Subject to any disclaimer, the term of this patent is extended or adjusted under 35 U.S.C. 154(b) by 166 days.

(21) Appl. No.: 16/866,095

(22) Filed: May 4, 2020

(65) Prior Publication Data

US 2021/0340890 A1  Nov. 4, 2021

(51) Int. Cl.
```
F01L 3/08      (2006.01)
F16K 41/04     (2006.01)
F02F 1/24      (2006.01)
F01L 3/00      (2006.01)
```
(52) U.S. Cl.
CPC ...... *F01L 3/08* (2013.01); *F02F 1/24* (2013.01); *F16K 41/04* (2013.01); *F01L 2003/25* (2013.01); *F02F 2001/244* (2013.01)

(58) Field of Classification Search
CPC ..... F01L 3/08; F01L 2003/25; F01L 2820/01; F01L 1/146; F01L 1/181; F01L 1/462; F01L 3/20; F01L 2001/054; F02F 1/24; F02F 2001/244; F16K 41/04
USPC ...................................... 123/193.5
See application file for complete search history.

(56) References Cited

U.S. PATENT DOCUMENTS

| | | | |
|---|---|---|---|
| 9,052,018 B2 | 6/2015 | Hegemier et al. | |
| 2009/0145393 A1* | 6/2009 | Sakata | F01L 3/08 |
| | | | 123/188.6 |
| 2013/0200574 A1* | 8/2013 | Hegemier | F01L 3/08 |
| | | | 277/502 |
| 2016/0341315 A1* | 11/2016 | Benedix | F16J 15/3252 |
| 2017/0089224 A1* | 3/2017 | Kizhakkethara | F02F 7/0021 |

FOREIGN PATENT DOCUMENTS

| | | |
|---|---|---|
| CN | 201851188 U | 6/2011 |
| EP | 2626524 B1 | 4/2017 |
| JP | 6534550 B2 | 6/2019 |

* cited by examiner

*Primary Examiner* — Scott A Reinbold
(74) *Attorney, Agent, or Firm* — Leydig, Voit & Mayer, Ltd

(57) ABSTRACT

A valve assembly for an engine includes a gas exchange valve, a valve guide, and a seal. The gas exchange valve includes a valve stem. The valve guide includes an outer surface having a stem seal retention surface disposed at a seal end thereof. The valve stem extends through the valve guide such that the valve is reciprocally movable over a range of travel along the longitudinal axis with respect thereto. The seal is mounted to the stem seal retention surface of the valve guide such that the seal is in running, sealing engagement with the valve stem. The stem seal retention surface includes a shoulder surface to help retain the seal.

19 Claims, 6 Drawing Sheets

STEM SEAL FOR VALVE ASSEMBLY OF MACHINE ENGINE

TECHNICAL FIELD

This patent disclosure relates generally to valve assemblies for an engine of a machine and, more particularly, to a stem seal of a valve assembly of a machine engine.

BACKGROUND

Each cylinder of a conventional internal combustion engine is equipped with one or more gas exchange valves (e.g., intake and exhaust valves) that are cyclically opened during normal operation to allow fuel and air into the engine and to discharge exhaust from the engine. The valves are opened by way of a camshaft/rocker arm arrangement. The camshaft includes one or more lobes oriented at particular angles corresponding to a desired lift timing sequence of the associated valves. The cam lobes are connected to respective stem ends of the valves by way of the rocker arm and an associated pushrod linkage. As the camshaft rotates, the cam lobes come into contact with a first pivoting end of the rocker arm, thereby forcing a second pivoting end of the rocker arm against the associated stem ends of the valves. This pivoting motion causes the valves to lift or open against a spring bias. As the cam lobes rotate away from the rocker arm, the valves are released and allowed to return to their closed positions.

In valve assemblies of combustion engines, in particular, inlet or exhaust valves of a combustion engine, lubricant such as, e.g., oil, is supplied to a valve guide and a valve stem movably disposed in the valve guide via a valve stem seal to inhibit wear. For example, a double lip seal may be used.

For high power engines, double lip gas valve stem seals provide lubrication between the valve and a valve guide to help avoid stuck-valve failures that could damage the engine. The stem seal can also reduce leakages through excessive "blowby" pressure due to high boost when the stem seal is tightly secured on the valve guide. Spatial constraints make it challenging to retain the valve stem seal to the valve guide via a valve spring. Without retention on valve guide, the valve stem seal can slide off from the guide due to high intake boost or exhaust back pressure and cause valve sticking, engine failure, and high blowby conditions.

Japanese Patent No. JP6534550B2 for a "Valve Stem Seal" is directed to providing a structure which makes a valve stem seal less likely to drop from a valve stem guide even when a back pressure acts on the valve stem seal including an oil lip and a back pressure lip. A valve stem seal is attached to a valve stem guide into which a valve stem is inserted so as to reciprocate and includes: an oil lip which makes slidable contact with an outer diameter surface of the valve stem; and a back pressure lip which similarly makes slidable contact with the outer diameter surface of the valve stem at a port side of the oil lip. A second back pressure lip which contacts with an oil chamber side end surface of the valve stem guide is provided in the valve stem seal. The second back pressure lip is formed in an oblique direction toward a port side and a radial inner side in its area from a lip base end part to a lip tip part.

There is an ongoing need in the art for an improved valve stem seals and valve assemblies that provides for enhanced sealing over a range of applications. It will be appreciated that this background description has been created by the inventors to aid the reader, and is not to be taken as an indication that any of the indicated problems were themselves appreciated in the art. While the described principles can, in some respects and embodiments, alleviate the problems inherent in other systems, it will be appreciated that the scope of the protected innovation is defined by the attached claims, and not by the ability of any disclosed feature to solve any specific problem noted herein.

SUMMARY

In one aspect of the present disclosure, there are described embodiments of a valve guide for an engine. In one embodiment, a valve guide includes a guide body with a mounting end and a seal end. The guide body is cylindrical and extends axially along a longitudinal axis between the mounting end and the seal end.

The guide body includes an inner surface and an outer surface. The inner surface defines a valve passage. The outer surface includes a stem seal retention surface disposed at the seal end of the guide body. The stem seal retention surface includes a distal face, an axial surface, and a shoulder surface.

The distal face is annular and projects radially outward from the inner surface. The axial surface has a face edge and a shoulder edge. The face edge is adjacent the distal face, and the shoulder edge is adjacent the shoulder surface. The axial surface extends axially from the face edge to the shoulder edge such that the shoulder edge is disposed radially outward of the face edge. The shoulder surface includes an inner end. The shoulder surface extends from the shoulder edge radially inwardly to the inner end such that the shoulder surface includes an engagement portion extending from the shoulder edge toward the inner end. The engagement portion has a shoulder slant angle relative to a radial plane perpendicular to the longitudinal axis. The shoulder slant angle is within fifteen degrees of the radial plane.

In another aspect, the present disclosure describes embodiments of a cylinder head for an engine. In one embodiment, a cylinder head includes a cylinder head body and a valve guide. The cylinder head defines a guide passage. At least a portion of the valve guide is disposed within the guide passage.

The valve guide includes a guide body with a mounting end and a seal end. The guide body is cylindrical and extends axially along a longitudinal axis between the mounting end and the seal end.

The guide body includes an inner surface and an outer surface. The inner surface defines a valve passage. The outer surface includes a stem seal retention surface disposed at the seal end of the guide body. The stem seal retention surface includes a distal face, an axial surface, and a shoulder surface.

The distal face is annular and projecting radially outward from the inner surface. The axial surface has a face edge and a shoulder edge. The face edge is adjacent the distal face, and the shoulder edge is adjacent the shoulder surface. The axial surface extends axially from the face edge to the shoulder edge such that the shoulder edge is disposed radially outward of the face edge. The shoulder surface includes an inner end. The shoulder surface extends from the shoulder edge radially inwardly to the inner end such that the shoulder surface includes an engagement portion extending from the shoulder edge toward the inner end. The engagement portion has a shoulder slant angle relative to a radial plane perpendicular to the longitudinal axis. The shoulder slant angle is within fifteen degrees of the radial plane.

In yet another aspect, the present disclosure describes embodiments of a valve assembly for an engine. In one embodiment, a valve assembly includes a valve, a valve guide, and a seal.

The valve includes a tip, a stem, and a head. The stem extends axially along a longitudinal axis and is interposed between the tip and the head.

The valve guide includes a guide body with a mounting end and a seal end. The guide body is cylindrical and extends axially along the longitudinal axis between the mounting end and the seal end. The guide body includes an inner surface and an outer surface. The inner surface defines a valve passage extending longitudinally between the seal end and the mounting end. The outer surface includes a stem seal retention surface disposed at the seal end of the guide body. The stem of the valve extends through the valve passage such that the valve is reciprocally movable over a range of travel along the longitudinal axis with respect to the valve guide.

The seal is hollow and extends along the longitudinal axis. The seal includes a mounting portion and a valve stem sealing portion. The mounting portion defines a valve guide cavity extending along the longitudinal axis and is retentively engaged with the stem seal retention surface of the valve guide such that the seal end of the valve guide is disposed within the valve guide cavity. The mounting portion includes a rib projecting radially inwardly into the valve guide cavity. The valve stem sealing portion defines a valve stem passage extending along the longitudinal axis and in communication with the valve guide cavity. The stem of the valve extends through the valve stem passage such that the valve stem sealing portion is in sliding, sealing engagement therewith.

The stem seal retention surface of the valve guide includes a distal face, an axial surface, and a shoulder surface. The distal face is annular and projects radially outward from the inner surface of the valve guide. The axial surface has a face edge and a shoulder edge. The face edge is adjacent the distal face, and the shoulder edge is adjacent the shoulder surface. The axial surface extends axially from the face edge to the shoulder edge such that the shoulder edge is disposed radially outward of the face edge.

The shoulder surface includes an inner end. The shoulder surface extends from the shoulder edge radially inwardly to the inner end such that the shoulder surface includes an engagement portion extending from the shoulder edge toward the inner end. The engagement portion has a shoulder slant angle relative to a radial plane perpendicular to the longitudinal axis. The shoulder slant angle is within fifteen degrees of the radial plane. The engagement portion is in retentive, interfering relationship with the rib of the seal.

Further and alternative aspects and features of the disclosed principles will be appreciated from the following detailed description and the accompanying drawings. As will be appreciated, the valve guides, cylinder heads, and valve assemblies disclosed herein are capable of being carried out in other and different embodiments, and capable of being modified in various respects. Accordingly, it is to be understood that both the foregoing general description and the following detailed description are exemplary and explanatory only and do not restrict the scope of the appended claims.

It should be understood that the drawings are not necessarily to scale and that the disclosed embodiments are illustrated diagrammatically and in partial views. In certain instances, details which are not necessary for an understanding of this disclosure or which render other details difficult to perceive may have been omitted. It should be understood that this disclosure is not limited to the particular embodiments illustrated herein.

DETAILED DESCRIPTION

This disclosure relates to engines utilized in various types of construction and mining machinery. The disclosure is directed to embodiments of a valve guide, an engine block, and a valve assembly. In embodiments, the disclosure is directed to providing a valve stem seal.

In embodiments following principles of the present disclosure, a gas lip valve stem seal is mounted to a valve guide using enhanced retention features formed on the valve guide. In embodiments, the valve guide includes a stem seal retention surface disposed at the seal end of the guide body. The stem seal retention surface includes a distal face, an axial surface, and a shoulder surface. In embodiments, the shoulder surface extends from a shoulder edge radially inwardly to an inner end such that the shoulder surface includes an engagement portion extending from the shoulder edge toward the inner end. The engagement portion has a shoulder slant angle relative to a radial plane perpendicular to the longitudinal axis. The shoulder slant angle is within fifteen degrees of the radial plane. In embodiments, the shoulder edge comprises a non-rounded intersection between the axial surface and the shoulder surface.

In embodiments, the axial surface includes a first axial portion adjacent the distal face and a second axial portion adjacent the shoulder surface. The first axial portion comprises an angled lead-in surface configured to facilitate the mounting of the valve stem seal to the valve guide. The second axial portion can have an axial slant angle that is greater than the axial slant angle of the first axial portion.

In embodiments following principles of the present disclosure, a valve guide can include a stem seal retention surface configured to retain a relatively axially short valve stem seal securely on the valve guide, and to provide adequate lubrication in the valve stem-guide interface to prevent the valve from getting stuck in the valve guide. In embodiments, a valve assembly constructed according to principles of the present disclosure can be used to retain a gas lip valve stem seal used in a high boost engines with high exhaust back pressure (greater than 400 kpa pressure).

Figure 1:
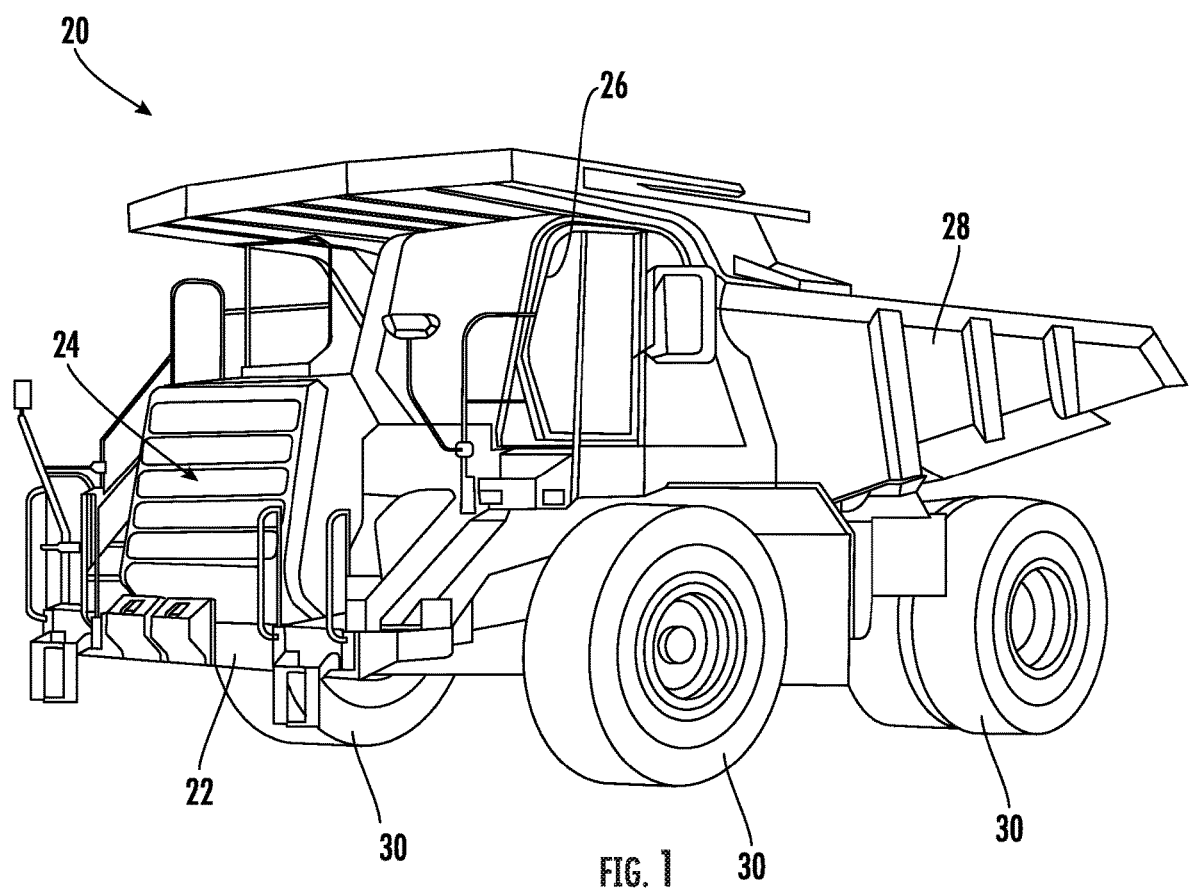
FIG. 1 is a diagrammatic perspective view of an embodiment of a machine including an embodiment of an engine having an embodiment of a valve assembly constructed in accordance with principles of the present disclosure.

Referring now to the drawings and in particular to FIG. 1, an embodiment of a machine 20 constructed in accordance with principles of the present disclosure is shown diagrammatically. It is to be understood that the machine 20 is shown primarily for illustrative purposes to assist in disclosing features of various embodiments of the present disclosure, and that a machine constructed according to principles of the present disclosure can include other components and have different forms. While the machine 20 is illustrated as an off-road truck, it will be understood, in other embodiments, the machine 20 can comprise other types of machines, such as, but not limited to, an on-road truck, a track-type machine, a motor grader, industrial mining equipment, a locomotive, an automobile, a marine vessel, electricity generating equipment, and any other such machine or piece of equipment that may be adapted to be used with an engine having one or more valves.

As shown in FIG. 1, the machine 20 can include a frame 22 configured to support an engine 24, a cab 26, a dump bed 28 pivotally mounted to the frame 22, and a plurality of ground-engaging members 30 configure to propel the machine 20 over the surface upon which it is supported. In embodiments, the engine 24 can comprise any suitable engine, such as, an internal combustion engine, a diesel engine, a natural gas engine, a hybrid engine or any combination thereof. The engine 24 can be configured as a power generating source that produces the operational power used to operate the machine 20.

The cab 26 can be suitably sized to accommodate a human operator. In embodiments, the operator compartment houses a control system configured to allow a machine operator to manipulate and articulate the dump bed 28 for a dumping operation or any other suitable application. The control system can include a steering system configured to control the movement of the machine 20. In embodiments, the steering system can have a steering wheel or a joystick, or other control mechanism to guide a motion of the machine 20, or parts thereof. Further, the operator compartment 26 can house other control levers, knobs, dials, displays, alarms, etc. to facilitate operation of the machine 20. In other embodiments, the machine 20 can be configured to be controlled remotely from a base station, in which case, the cab 26 can be sized to be smaller or eliminated.

In embodiments, the ground-engaging members 30 are rotatably coupled to the frame 22. In embodiments, at least one ground-engaging member 30 can be selectively driven by the engine 24 in order to propel the machine 20 in a direction of travel that can be controlled by the control system in the cab 26. Although the ground-engaging members 30 illustrated in FIG. 1 are a set of wheels, it will be understood that in other embodiments, other types of ground-engaging members, such as continuous tracks and the like, can be used.

Figure 2:
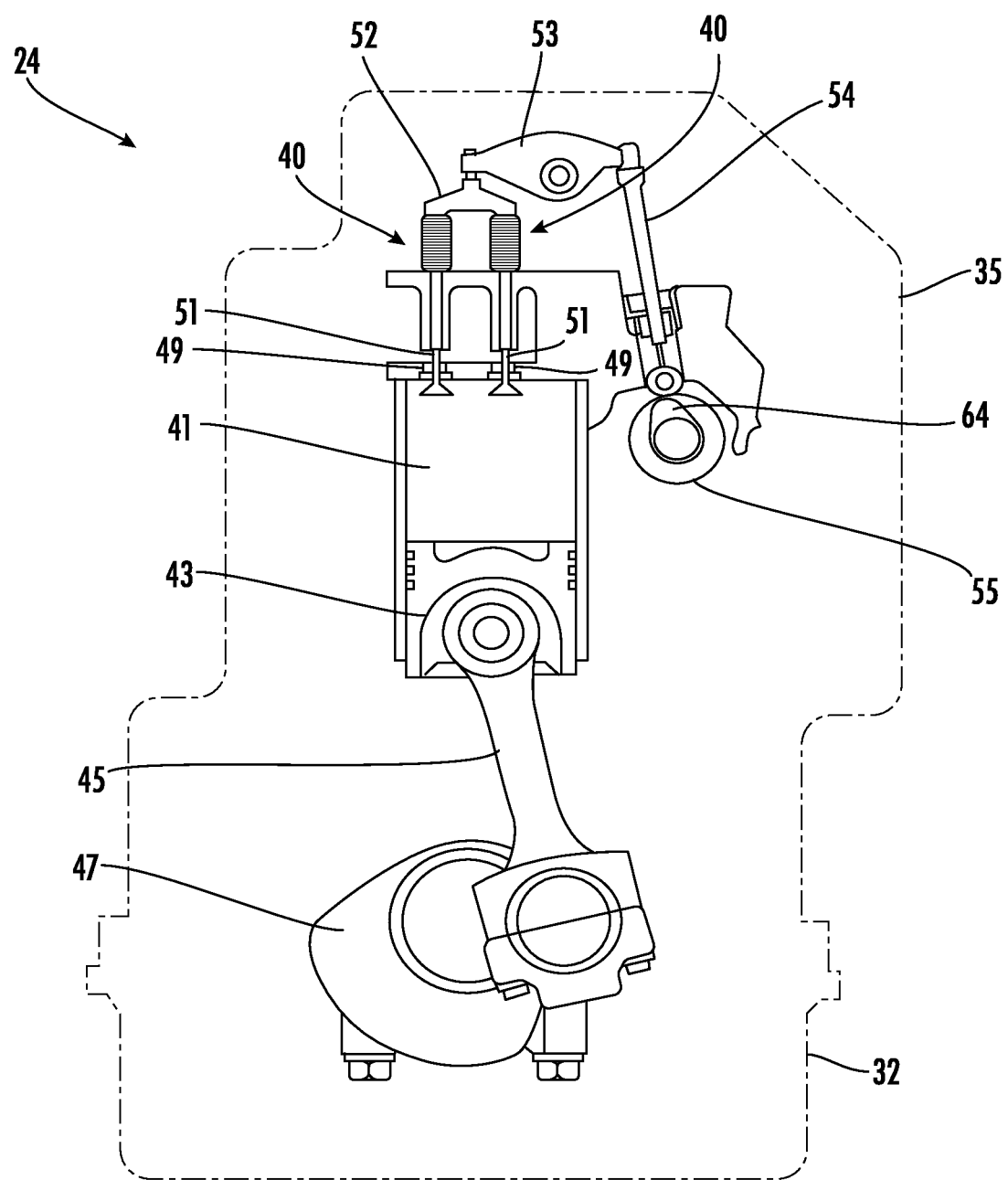
FIG. 2 is a diagrammatic side view of an embodiment of an engine suitable for use in the machine of FIG. 1 having an embodiment of a valve assembly constructed in accordance with principles of the present disclosure.

Referring to FIG. 2, a diagrammatic view of a portion of the engine 24, which is an illustrative embodiment of principles of the present disclosure, is shown. In embodiments, the engine 24 can be any internal combustion engine suitable for the intended application. In embodiments, the engine 24 can be operated on a suitable fuel, such as, diesel, gasoline, gaseous fuels, or a combination thereof, for example.

In embodiments, the engine 24 can be of a single-cylinder type (as shown), or a multi cylinder engine. The engine 24 illustrated in FIG. 2 is an inline type single-cylinder engine. However, it will be appreciated that in embodiments any suitable configuration of the engine 24 can be used, including, but not limited to, V-type, radial, rotary or the like. In embodiments, the engine 24 can be of any suitable type, such as, diesel or gasoline compression ignition engine, spark ignition engine, direct or port injection engine, and the like.

In embodiments, the engine 24 can be used in any type of vehicle or machine that performs a driven operation involving physical movement associated with a particular industry, such as, without limitation, transportation, mining, construction, landscaping, forestry, agriculture, waste management, material handling, etc. It should be understood that the engine 24 is shown primarily for illustrative purposes to assist in disclosing features of various embodiments, and that FIG. 1 does not depict all of the components of an engine.

In embodiments, the engine 24 includes a cylinder block 32, a cylinder head 35, and at least one valve assembly 40. The cylinder block 32 defines a cylinder 41 or combustion chamber that receives a piston 43 adapted to reciprocate between a top-dead-center position and a bottom-dead-center position therein. A connecting rod 45 connects the piston 43 to a crankshaft 47 of the engine 24 such that reciprocating motion of the piston 43 between the top-dead-center position and the bottom-dead-center position results in a rotational motion of the crankshaft 47.

In embodiments, the cylinder block 32 defines a plurality of cylinders 41. Each cylinder 41 can contain a corresponding piston 43 that reciprocates within the cylinder 41 to generate mechanical energy from the chemical energy produced through combustion of a fuel within a combustion chamber of the respective cylinder 41. Each piston 43 can be connected to the crankshaft 47 via a corresponding connecting rod 45, such that reciprocating movement of the pistons 41 is translated into rotational motion to produce useful work in a machine with which the engine 24 is associated.

The cylinder head 35 is mounted on the cylinder block 32. The cylinder head 35 can be bolted to the cylinder block 32 to seal the cylinders 41. The cylinder head 35 defines a plurality of ports 49 that are each configured to function as an intake port or an exhaust port. In embodiments, the cylinder head 35 defines at least one intake port 49 and at least one exhaust port in fluid communication with each cylinder 41. The ports 49 shown in FIG. 1 comprise a pair of intake ports in fluid communication with the cylinder 41 and each with a corresponding intake valve assembly 40. The cylinder head 35 can also define a pair of exhaust ports associated with corresponding exhaust valve assemblies and in fluid communication with the cylinder 41. The intake ports 49 and the exhaust ports allow the selective intake of gases into the cylinder 41 and exhaust of gases out of the cylinder 41, respectively.

Each of the valve assemblies 40 of the engine 24 shown in FIG. 2 comprises an inlet valve assembly. In the illustrated embodiment, the inlet valve assemblies 40 each includes an inlet valve 51 respectively received within the intake ports 49. Each inlet valve assembly 40 is actuated to control a flow of gases into the cylinder 41 through the corresponding intake port 49. Each inlet valve assembly 40 is configured to selectively occlude the corresponding intake port 49 such that fluid cannot flow into the cylinder 41 through the intake port 49. A bridge 52 connects the two valve assemblies to a rocker arm 53 connected to the inlet valves 51, which in turn, is connected to a push rod 54 such that axial movement of the push rod 54 in one direction causes both inlet valves 51 to move in an opposing direction.

The engine 24 also includes exhaust valve assemblies (not shown), having a construction similar to the inlet valve assemblies 40, but associated with the exhaust ports. Each exhaust valve assembly is actuated to control a flow of exhaust gas from the cylinder 41 through a corresponding exhaust port. In an example, pairs of exhaust valve assemblies are received within respective exhaust ports and associated with a push rod in a similar manner as described above.

The engine 24 further includes a camshaft 55 disposed within the cylinder block 32. The camshaft 55 is operatively arranged with the crankshaft 47 such that a rotational movement of the crankshaft 47 causes a corresponding rotational movement of the camshaft 55. In turn, rotational movement of the camshaft 55 actuates the inlet valves 51 and the exhaust valves, respectively via an associated push rod linkage as described above, to selectively open and close the intake ports 49 and exhaust ports according to a predetermined timing sequence. The camshaft 55 can include a number of cam lobes 57 corresponding to the number of valve assemblies 40 of the engine 24 and spaced apart from each other along a length thereof to selectively move an associated push rod 54. In other embodiments, as will be appreciated by one skilled in the art, the engine 24 can include a common rail system configured to actuate the valves.

Figure 3:
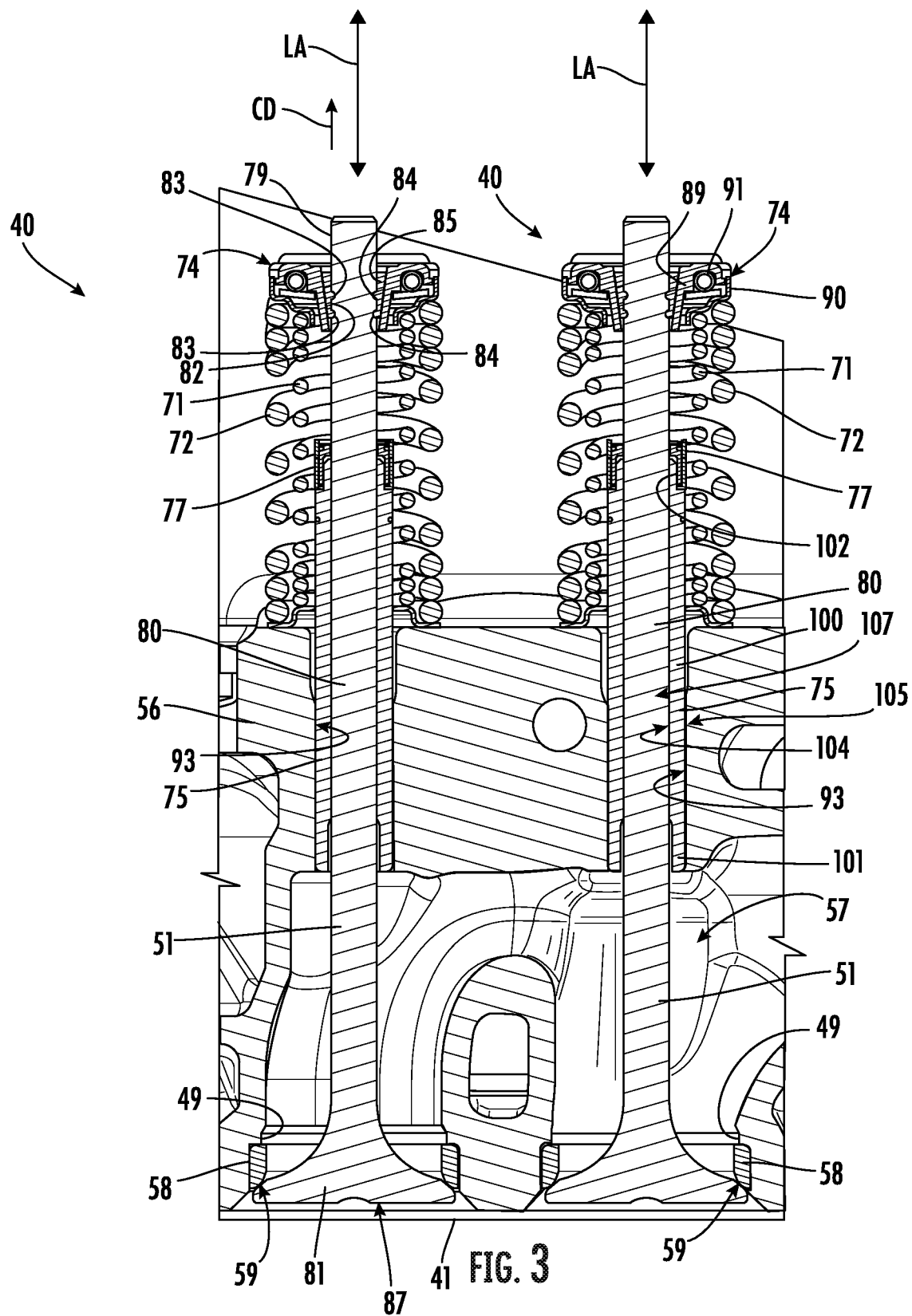
FIG. 3 is an elevational view, in section, of an embodiment of a valve assembly constructed in accordance with principles of the present disclosure.

Referring to FIG. 3, the cylinder head 35 includes a cylinder head body 56 that can define at least one fluid passage 57 in the form of an intake passage in the form of an exhaust passage associated with each cylinder 41. Each of the fluid passages 57 has at least one port 49 in fluid communication therewith so as to be configured to direct gas (e.g., air and/or exhaust) or a mixture of gas and fluid (e.g., fuel) respectively into and out of the associated cylinder 41 via the ports 49 defined by the cylinder head body 56. The fluid passages 57 in the form of intake passages can be configured to deliver compressed air and/or an air and fuel mixture into a top end of the cylinder 41 and those that are exhaust passages can be configured to direct exhaust and residual gases from the top end of the cylinder 41 to the atmosphere.

The cylinder head 35 includes a valve seat 58 disposed within each of the ports 49 defined by the cylinder head body 56. In embodiments, the valve seat 58 can comprise a replaceable wear component pressed into the port 49 defined by the cylinder head body 56. In other embodiments, the valve seat 58 can be an integral portion of the cylinder head body 56. Each valve seat 58 is generally ring-like with an internal conical sealing surface 59 that is configured to be engaged by the valve 51 respectively associated therewith when the valve 51 is moved to its closed position, as shown in FIG. 3, to block the flow of fluid through the port 49 associated therewith.

The exemplary valve arrangement illustrated in FIG. 3 is representative of an intake arrangement and/or an exhaust arrangement of the engine 24. The valve assemblies 40 can have a similar configuration either as an inlet valve or as an exhaust valve, such that only the configuration of the intake valve assembly 40 will be described herein. However, it should be appreciated that the same description also applies to an exhaust valve assembly. Similarly, it will be appreciated that the description of one intake valve assembly 40 is applicable to other intake valve assemblies 40, as well.

In the illustrated embodiment, each valve assembly 40 includes the valve 51, a pair of valve springs 71, 72, a rotocoil 74, a valve guide 75, and a seal 77. The valve 51 is reciprocally disposed within the valve guide 75 such that the valve 51 is movable over a range of travel between the closed position, as shown in FIG. 3, and the open position, as shown in FIG. 2. The valve 51 is biased to the closed position via the pair of valve springs 71, 72 and is configured to be actuated to move to the open position via an actuating mechanism of the engine 24, which is the camshaft 55 in the illustrated embodiment of FIG. 2. The pair of valve springs 71, 72 are mounted to the valve 51 via the rotocoil 74 and engaged with the cylinder head body 56 such that the valve 51 is biased to the closed position against the valve seat 58. The rotocoil 74 is mounted to the valve 51. The valve guide 75 is mounted to the cylinder head body 56. The seal 77 is mounted to the valve guide 75 such that the seal 77 is in running sealing engagement with the valve 51.

The valve 51 includes a tip 79, a stem 80, and a head 81. The head 81 is disposed in opposing relationship to the tip 79. The stem 80 extends axially along a longitudinal axis LA and is interposed between the tip 79 and the head 81.

The tip 79 of the valve 51 is configured to be received within a pocket of the bridge 52 (see FIG. 2). The stem 80 joins the tip 79 at a neck 82 which defines at least one circumferential groove 83 configured to receive inward annular protrusions 84 of a keeper 85, which retains the distal ends of the rotocoil 74 and the pair of springs 71, 72 in their axial positions on the valve 51. The tip 79 and the stem 80 are disposed radially within the pair of valve springs 71, 72 and the rotocoil 74.

The head 81 of the valve 51 is disposed radially with respect to the valve seat 58 such that the head 81 is in sealing engagement with the valve seat 58 when the valve 51 is in the closed position. The stem 80 of the valve 51 is disposed radially inside of the valve guide 75 and radially inside of the seal 77 which is mounted to the valve guide 75.

In embodiments, the valve assembly 40 includes at least one valve spring 71, 72 configured to bias the valve 51 relative to the valve guide 75 to the closed position. Each valve spring 71, 72 can be mounted to the tip 79 of the valve 51 at one end and be in engaging relationship with the cylinder head body 56 such that the valve spring 71, 72 urges the tip 79 of the valve 51 to move away from the cylinder head body 56 in a closing direction CD along the longitudinal axis LA, thereby sealing the head 81 of the valve 51 against the valve seat 58.

The illustrated embodiment includes the pair of valve springs 71, 72 which are arranged radially with respect to each other such that there is an inner spring 71 and an outer spring 72 which circumscribes the inner spring 71. The pair of springs 71, 72 can be configured to provide for desired operation of the valve 51 over the range of travel between the closed position and the open position.

In embodiments, the rotocoil 74 can be provided to function as a spring retainer, keeping the pair of springs 71, 72 in compression at their desired locations around the valve 51. The rotocoil 74 can be configured to rotate the valve 51 about the longitudinal axis LA during each opening/closing event, thereby inhibiting burning of the valve 51 through even distribution of heat loads across a face 87 of the valve 51. The illustrated rotocoil 74 has a generally cylindrical rotocoil body 89 with a narrow diameter portion configured to be positioned radially within the inner spring 71, an outer housing 90 configured to rest on an axial end of the pair of springs 71, 72, and a spiral spring 91 disposed within a channel between the rotocoil body 89 and the housing 90.

In embodiments, the valve guide 75 is configured to guide the valve 51 during reciprocal movement thereof so that the head 81 is in sealing engagement with the valve seat 58 when the valve 51 is in the closed position. The valve guide 75 is generally cylindrical and hollow, extending along the longitudinal axis LA of the valve 51.

The cylinder head body 56 defines a guide passage 93 for every valve guide 75 associated therewith. In embodiments, at least a portion of the valve guide 75 (e.g., a bottom end portion) is disposed within the guide passage 93. In the illustrated embodiment, the valve guide 75 is a component separate from the cylinder head body 56 and is secured in the guide passage 93 via a press fit or other suitable technique, as will be appreciated by one skilled in the art. In other embodiments, the valve guide 75 is integrally formed with the cylinder head body 56 and it is integral with the guide passage 93.

The valve guide 75 includes a guide body 100 with a mounting end 101 and a seal end 102. The guide body 100 is cylindrical and extends axially along the longitudinal axis LA between the mounting end 101 and the seal end 102. The mounting end 101 is secured to the cylinder head body 56 by being press fit within the guide passage. The seal end 102 projects outwardly from the cylinder head body 56 as a free end of the valve guide 75.

The guide body 100 includes an inner surface 104 and an outer surface 105. The inner surface 104 defines a valve passage 107 extending longitudinally between the mounting end 101 and the seal end 102. The stem 80 of the valve 51 extends through the valve passage 107 such that the valve 51 is reciprocally movable over a range of travel between the closed position and the open position along the longitudinal axis LA with respect to the valve guide 75.

Figure 4:
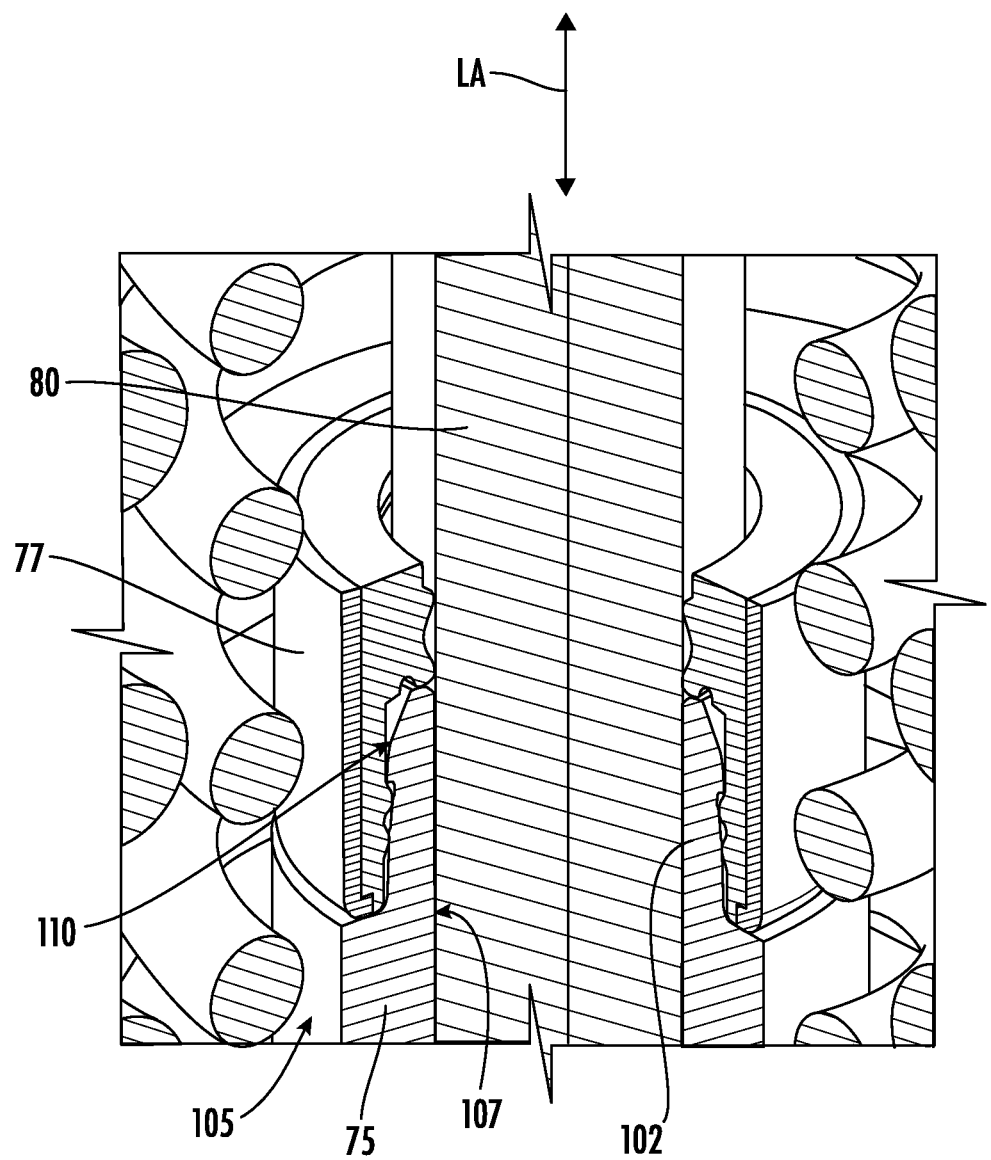
FIG. 4 is an enlarged, perspective view of the valve assembly of FIG. 3, illustrating a valve stem seal in partial section for illustrative purposes.

Referring to FIG. 4, the outer surface 105 of the valve guide 75 includes a stem seal retention surface 110 disposed at the seal end 102 of the valve guide 75. The seal 77 is hollow and extends along the longitudinal axis LA. The seal 77 can be configured to retain an amount of lubricant inside the valve guide 75 to provide lubrication between the stem 80 and the valve guide 75 during reciprocal relative movement of the stem 80 inside the valve passage 107 of the valve guide. The seal 77 is configured to be attached to the seal end 102 of the valve guide 75 such that the seal 77 is in sealing engagement with the stem 80. In embodiments, the seal 77 is configured to be attached to the valve guide 75 by press-fitting. In the illustrated embodiment, the seal 77 is configured to be placed over the seal end 102 of the valve guide (i.e., the portion not positioned within the cylinder head body 56) and configured to engage the stem seal retention surface 110 in order to secure the seal 77 to the valve guide 75.

Figure 5:
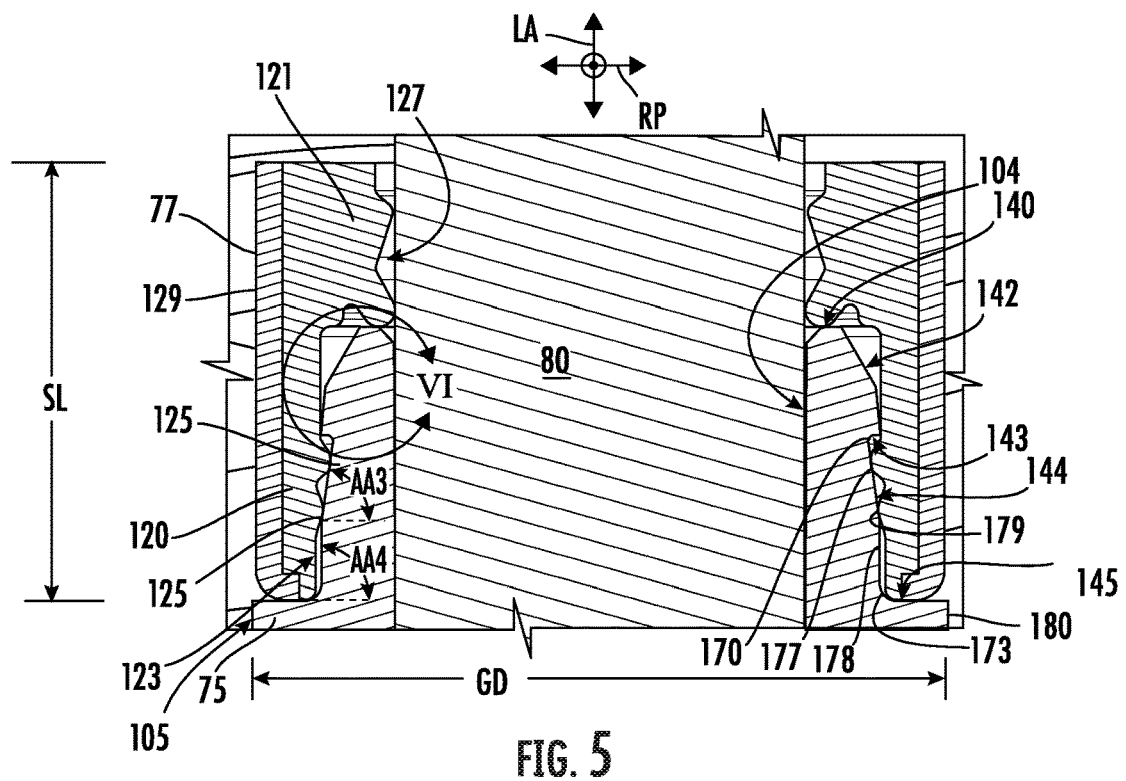
FIG. 5 is an enlarged, detail view of the valve assembly of FIG. 3, illustrating the valve stem seal in elevational section.

Referring to FIG. 5, the illustrated seal 77 comprises a double gas lip seal. It is contemplated, however, that the seal 77 can have different forms in other embodiments, such as a labyrinth seal, for example. In embodiments, different types of stem seals can be used for intake valve assemblies and exhaust valve assemblies.

In embodiments, the seal 77 includes a mounting portion 120 and a valve stem sealing portion 121. The mounting portion 120 defines a valve guide cavity 123 extending along the longitudinal axis LA and is retentively engaged with the stem seal retention surface 110 of the valve guide 75 such that the seal end 102 of the valve guide 75 is disposed within the valve guide cavity 123. In embodiments, the mounting portion 120 includes at least one annular retention rib 125 projecting radially inwardly into the valve guide cavity 123. In the illustrated embodiments, the mounting portion 120 of the seal 77 includes two annular retention ribs 125. The retention ribs 125 can be configured to help secure the seal 77 to the valve guide 75.

The mounting portion 120 can be configured for substantially fluid-tight engagement with the stem seal retention surface 110 of the valve guide 75 via the annular retention ribs 125. For example, the mounting portion 120 can be attached to valve guide 75 by press-fitting or the like. In embodiments, the mounting portion 120 is slightly smaller radially such that the mounting portion deforms in response to being press-fit upon the stem seal retention surface 110 of the valve guide 75, resulting in a secure and substantially fluid-tight connection between the seal 77 and the valve guide 75.

The valve stem sealing portion 121 defines a valve stem passage 127 extending along the longitudinal axis LA and in communication with the valve guide cavity 123. The stem 80 of the valve extends through the valve stem passage 127 such that the valve stem sealing portion 121 of the seal 77 is in running, sealing engagement therewith. In embodiments, the valve stem sealing portion 121 is configured to allow for at least a predetermined amount of lubricant to enter the valve guide 75 during reciprocation of the stem 80 in the valve guide 75.

In the illustrated embodiment, the seal 77 includes a seal body 129 that is generally cylindrical. The mounting portion 120 and the valve stem sealing portion 121 are integrally formed together and are contained within the seal body 129. In embodiments, the seal body can be made from any suitable metal, and the mounting portion 120 and the valve stem sealing portion can be made from any suitable material that can perform their intended function. In embodiments, the seal body 129 is made from a material different from that used for the mounting portion 120 and the valve stem sealing portion 121

Referring to FIG. 5, in embodiments, the seal 77 has an axial seal length SL measured along the longitudinal axis LA that is relatively short relative to the length of the valve guide 75. The valve guide 75 has a valve guide diameter GD. In embodiments, a ratio of the axial seal length SL to the valve guide diameter GD is less than 1. In other embodiments, a ratio of the axial seal length SL to the valve guide diameter GD is less than 0.8, and is less than 0.75 in yet other embodiments, and less than two thirds in still other embodiments.

In embodiments, the stem seal retention surface 110 of the valve guide 75 can be configured to help prevent blow-by, such as can occur used in a high boost engines with high exhaust back pressure (greater than 400 kpa pressure), which may result in lubricant on the inner surface 104 of valve guide 75 being pushed past the seal 77, leaving part of the valve guide 75 without sufficient lubrication. In the illustrated embodiment, the stem seal retention surface 110 of the valve guide 75 includes a distal face 140, a first axial surface 142, a shoulder surface 143, a second axial surface 144, and a proximal seat surface 145. The first axial surface 142 extends between the distal face 140 and the shoulder surface 143. The second axial surface 144 extends between the shoulder surface 143 and the proximal seat surface 145.

Figure 6:
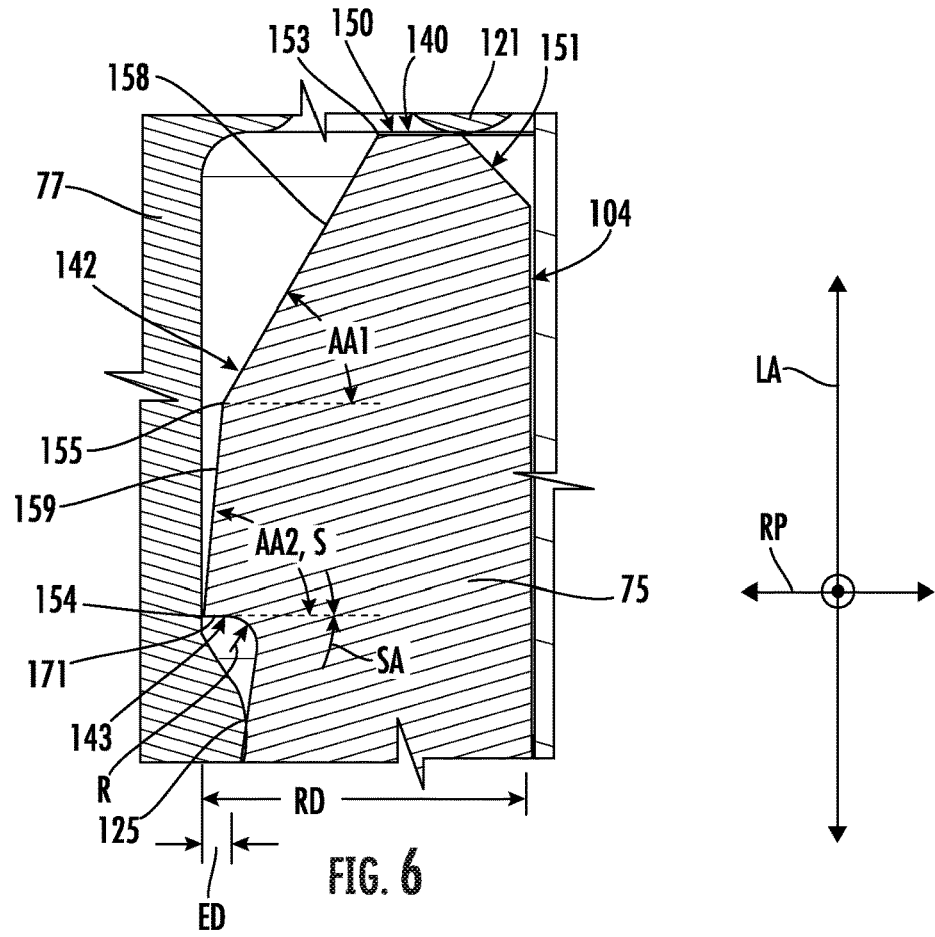
FIG. 6 is an enlarged, detail view from FIG. 5, as indicated by circle VI, of the valve assembly of FIG. 3.

Referring to FIG. 6, the distal face 140 is annular and projects radially outward from the inner surface 104 of the valve guide 75. The distal face 140 can be configured to be placed in sealing contact with the valve sealing portion 121 of the seal 77. The distal face 140 illustrated in FIG. 6 includes a planar surface 150 adjacent the first axial surface 142 and a countersink surface 151 adjacent the inner surface 104. The planar surface 150 is generally ring-shaped, and the countersink surface 151 is frustoconical.

In the illustrated embodiment, the first axial surface 142 has a face edge 153, a shoulder edge 154, and an intermediate edge 155. The face edge 153 is adjacent the distal face 140, and the shoulder edge 154 is adjacent the shoulder surface 143. In embodiments, the first axial surface 142 extends axially from the face edge 153 to the shoulder edge 154 such that the shoulder edge 154 is disposed radially outward of the face edge 153, as is shown in FIG. 6.

In the illustrated embodiment, the first axial surface 142 includes a first axial portion 158 and a second axial portion 159. The first axial portion 158 includes the face edge 153, and the second axial portion 159 includes the shoulder edge 154. In the illustrated embodiment, the first axial portion 158 extends axially from the face edge 153 to the intermediate edge 155, and the second axial portion 159 extends from the intermediate edge 155 to the shoulder edge 154. The first axial portion 158 has a first axial slant angle AA1 relative to a radial plane RP perpendicular to the longitudinal axis LA, and the second axial portion 159 has a second axial slant angle AA2 that is greater than the first axial slant angle AA1.

In embodiments, the first axial slant angle AA1 is in a range between 40 and 75 degrees, in a range between 50 and 70 degrees in other embodiments, and in a range between 55 and 65 degrees in still other embodiments. In the illustrated embodiment, the first axial slant angle AA1 is sixty degrees.

In embodiments, the second axial slant angle AA2 is in a range between 75 and 90 degrees in which a ninety degree slant angle is substantially parallel to the longitudinal axis LA. In other embodiments, the second axial slant angle AA2 is in a range between 80 and 90 degrees. In yet other embodiments, the second axial slant angle AA2 is in a range between greater than 75 degrees and less than 90 degrees. In the illustrated embodiments, the second axial slant angle AA2 is eighty-five degrees.

The shoulder surface 143 includes an inner end 170. The shoulder surface 143 extends from the shoulder edge 154 radially inwardly to the inner end 170 such that the shoulder surface 143 includes an engagement portion 171 extending from the shoulder edge 154 toward the inner end 170. In embodiments, the inner end 170 comprises a fillet having a radius R that is no greater than 0.2 mm, and no greater than 0.1 mm in other embodiments.

In embodiments, the engagement portion 171 has a shoulder slant angle SA relative to the radial plane RP which is perpendicular to the longitudinal axis LA that is within fifteen degrees of the radial plane RP. In embodiments, the shoulder slant angle SA of the engagement portion 171 of the shoulder surface 143 is within ten degrees of the radial plane RP, and within five degrees of the radial plane RP in still other embodiments.

In the illustrated embodiment, the engagement portion 171 of the shoulder surface 143 is substantially planar and has a shoulder slant angle SA relative to the radial plane RP which is substantially zero such that the engagement portion is substantially parallel with the radial plane RP. In embodiments, the engagement portion 171 extends inwardly from the shoulder edge 154 toward the inner surface 104 over a radial rib engagement distance ED of at least 0.125 mm.

The engagement portion 171 is in retentive, interfering relationship with the annular retention rib 125 of the seal 77. In embodiments, the shoulder edge 154 is disposed a radial edge distance RD from the inner surface 104 of the valve guide 75, and the engagement portion 171 of the shoulder surface 143 extends inwardly from the shoulder edge 154 toward the inner surface 104 over the radial rib engagement distance ED such that a ratio of the radial rib engagement distance ED of the engagement portion 171 to the radial edge distance RD of the shoulder edge 154 is at least 0.04.

In the illustrated embodiment, the shoulder edge 154 comprises a non-rounded intersection between the first axial surface 142 and the shoulder surface 143. In the illustrated embodiment, the shoulder edge 154 comprises an angled corner between the first axial surface 142 and the shoulder surface 143 which define a shoulder angle S therebetween. In embodiments, the shoulder angle S is in a range between 45 degrees and 95 degrees and in a range between 70 degrees and 92.5 degrees in other embodiments. In the illustrated embodiment, the second axial portion 159 of the first axial surface 142 and the engagement portion 171 of the shoulder surface 143 define the shoulder angle S, which is the same as the second axial slant angle AA2. In the illustrated embodiment, the shoulder angle S is eighty-five degrees.

Referring to FIG. 5, the second axial surface 144 extends axially from the inner end 170 of the shoulder surface 143 toward the mounting end of the valve guide 75 to an outer radial portion 173 such that the outer radial portion 173 is disposed radially outward of the inner end 170 of the shoulder surface 143.

In the illustrated embodiment, the second axial surface includes a third axial portion 177 and a fourth axial portion 178 with a second intermediate edge 179 disposed therebetween. The third axial portion 177 extends between the inner end 170 of the shoulder 143 and the second intermediate edge 179, and the fourth axial portion 178 extends between the second intermediate edge 179 and the outer radial portion 173.

The third axial portion has a third axial slant angle AA3 relative to the radial plane RP perpendicular to the longitudinal axis LA, and the fourth axial portion 178 has a fourth axial slant angle AA4 that is greater than the third axial slant angle AA3. In embodiments, the third axial slant angle AA3 is greater than the first axial slant angle AA1 and less than the second axial slant angle AA2. In embodiments, the fourth axial slant angle AA4 can be greater than the second axial slant angle AA2. In the illustrated embodiment, the fourth axial portion 178 is generally cylindrical such that the fourth axial slant angle AA4 is about ninety degrees, and can be a right cylinder in embodiments.

The proximal seat surface 145 is annular and projects radially outward from the second axial surface 144 to a cylindrical portion 180 of the outer surface 104 that defines the guide diameter GD. The proximal seat surface 145 can be configured to support the seal 77 when mounted to the valve guide 75.

Figure 7:
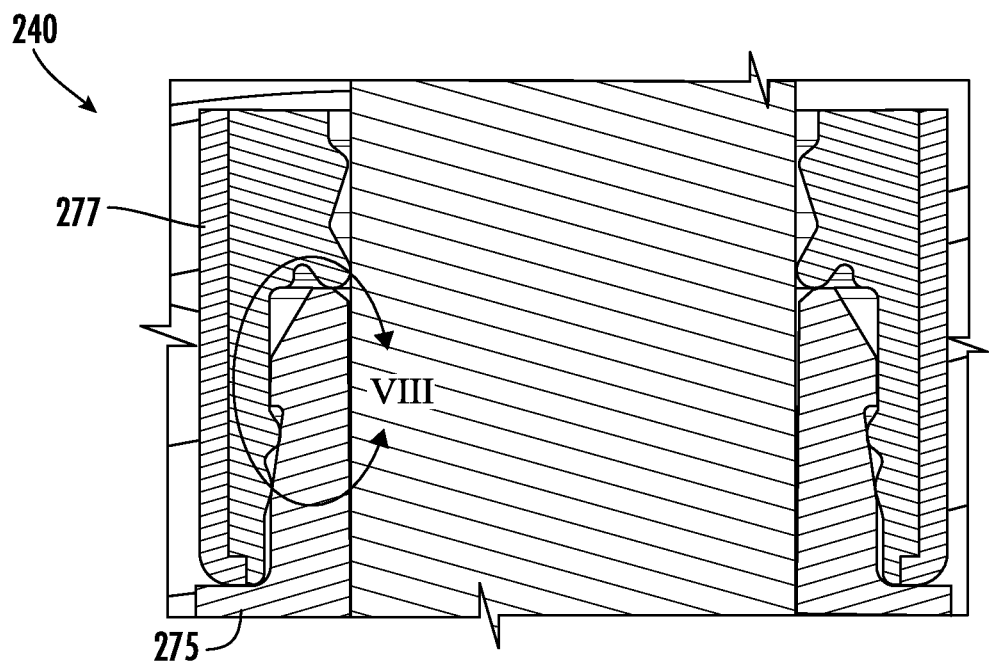
FIG. 7 is a view as in FIG. 5 of another embodiment of a valve assembly constructed according to principles of the present disclosure.
Figure 8:
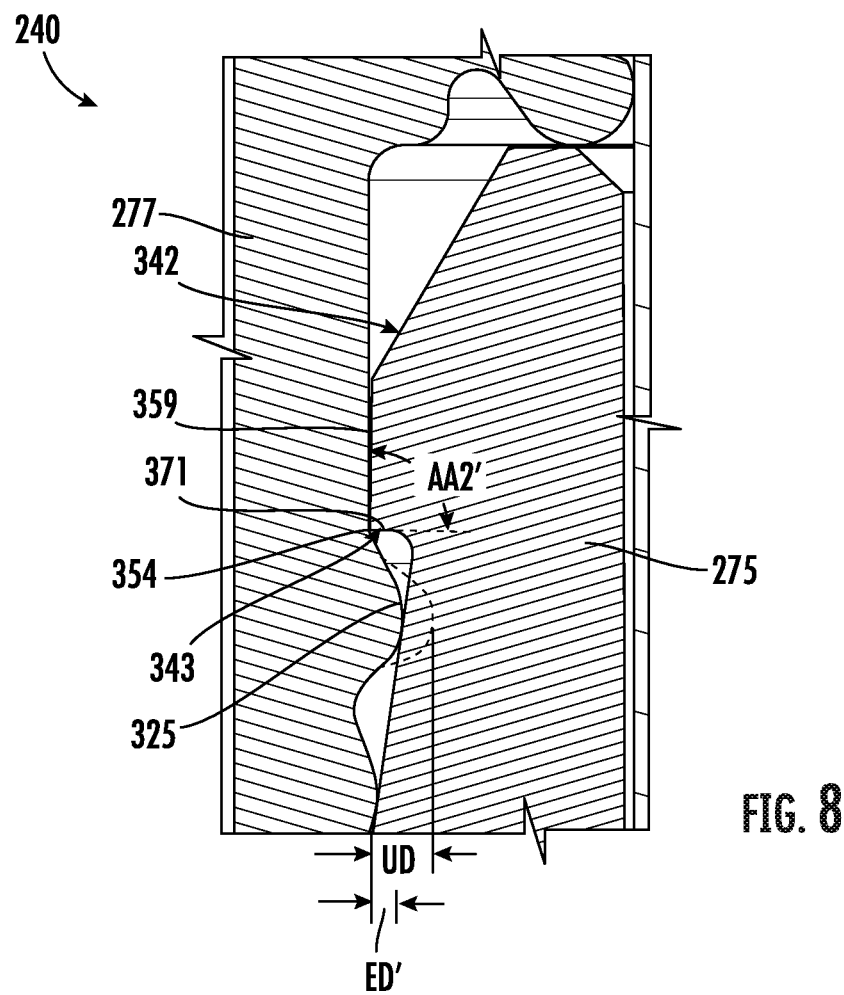
FIG. 8 is an enlarged, detail view from FIG. 7, as indicated by circle VIII, of the valve assembly of FIG. 7.

Referring to FIGS. 7 and 8, another embodiment of a valve assembly 240 constructed according to principles of the present disclosure is shown. The valve assembly 240 includes a valve 251, a valve guide 275, and a seal 277. Referring to FIG. 8, the valve guide 275 includes a first axial surface 342 with a second axial portion 359 that is substantially cylindrical such that it has a slant angle AA2' of about eighty nine degrees. The valve guide 275 of FIGS. 7 and 8 is similar in other respects to the valve guide 75 of FIGS. 5 and 6.

The engagement portion 371 of the shoulder surface 343 extends inwardly from the shoulder edge 354 toward the inner surface over a radial engagement distance ED'. The annular retention rib 325 of the seal 277, in an uncompressed condition, extends radially inwardly beyond the radial position of the shoulder edge 354 by an uncompressed distance UD at least twice as great as the radial engagement distance ED'. The components of the valve assembly 240 of FIGS. 7 and 8 can be similar in other respects to those of the valve assembly 40 of FIG. 3.

INDUSTRIAL APPLICABILITY

The industrial application of embodiments of an engine having at least one of a valve guide, a cylinder head for an engine, and a valve assembly constructed according to principles described herein should be readily appreciated from the foregoing discussion. The disclosed principles can be applicable to any machine utilizing an engine, or any other suitable application involving a valve stem seal.

A valve stem seal constructed according to principles of the present disclosure may have a wide application in a plurality of engine types including, for example, gas engines and dual fuel powered engines. Using an embodiment of a valve stem seal according to the present disclosure, it can be possible to control the amount of lubrication provided to the valve stem and the valve guide during the service life of the engine.

The present disclosure has features, as discussed, which can enhance the seal made between a seal and a valve stem. In embodiments following principles of the present disclosure, a valve guide can include a stem seal retention surface configured to retain a relatively axially short valve stem seal securely on the valve guide, and to provide adequate lubrication in the valve stem-guide interface to prevent the valve from getting stuck in the valve guide. In embodiments, a valve assembly constructed according to principles of the present disclosure can be used to retain a gas lip valve stem seal used in a high boost engines with high exhaust back pressure (greater than 400 kpa pressure).

In embodiments, a stem seal constructed according to principles of the present disclosure can be made as a relatively lower cost, short valve stem seal with low installation force. In embodiments, a stem seal constructed according to principles of the present disclosure can be implemented as a relatively axially shorter stem seal on a valve guide with tight spatial constraints. Embodiments of a valve guide constructed according to principles of the present disclosure can be manufactured with cast iron or powder metallurgy steel and do not need to rely on guide surface finish for valve stem seal retention.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for the features of interest, but not to exclude such from the scope of the disclosure entirely unless otherwise specifically indicated.

Recitation of ranges of values herein are merely intended to serve as a shorthand method of referring individually to each separate value falling within the range, unless otherwise indicated herein, and each separate value is incorporated into the specification as if it were individually recited herein. It should be noted that, for the purposes of this disclosure, the term "about," when used in reference to a dimension, may be interpreted as "within manufacturing tolerances" as would be understood by one skilled in the art. All methods described herein can be performed in any suitable order unless otherwise indicated herein or otherwise clearly contradicted by context.

What is claimed is:

1. A valve guide for an engine, the valve guide comprising:
    a guide body with a mounting end and a seal end, the guide body being cylindrical and extending axially along a longitudinal axis between the mounting end and the seal end, the guide body including an inner surface and an outer surface, the inner surface defining a valve passage;
    wherein the outer surface includes a stem seal retention surface, the stem seal retention surface disposed at the seal end of the guide body, the stem seal retention surface including a distal face, an axial surface, and a shoulder surface,
        the distal face being annular and projecting radially outward from the inner surface,
        the axial surface having a face edge and a shoulder edge, the face edge adjacent the distal face, and the shoulder edge adjacent the shoulder surface, the axial surface extending axially from the face edge to the shoulder edge such that the shoulder edge is disposed radially outward of the face edge,
        the shoulder surface including an inner end, the shoulder surface extending from the shoulder edge radially inwardly to the inner end such that the shoulder surface includes an engagement portion extending from the shoulder edge toward the inner end, the engagement portion having a shoulder slant angle relative to a radial plane perpendicular to the longitudinal axis, the shoulder slant angle being within fifteen degrees of the radial plane,
    wherein the shoulder edge is disposed a radial edge distance from the inner surface of the guide body, and the engagement portion of the shoulder surface extends inwardly from the shoulder edge toward the inner surface over a radial rib engagement distance, and wherein a ratio of the radial rib engagement distance to the radial edge distance is at least 0.04, and
    wherein the axial surface includes a first axial portion and a second axial portion, the first axial portion including the face edge, the second axial portion including the shoulder edge, the first axial portion having a first axial slant angle relative to the radial plane, the second axial portion having a second axial slant angle relative to the radial plane, the second axial slant angle being greater than the first axial slant angle, and wherein the second axial slant angle is in a range between greater than 75 and less than 90 degrees.

2. The valve guide according to claim 1, wherein the shoulder slant angle of the engagement portion of the shoulder surface is within five degrees of the radial plane.

3. The valve guide according to claim 1, wherein the engagement portion of the shoulder surface is substantially planar and extends inwardly from the shoulder edge toward the inner surface over a radial rib engagement distance of at least 0.125 mm.

4. The valve guide according to claim 1, wherein the shoulder edge comprises a non-rounded intersection between the axial surface and the shoulder surface.

5. The valve guide according to claim 1, wherein the shoulder edge comprises an angled corner between the axial surface and the shoulder surface having a shoulder angle therebetween, the shoulder angle being in a range between 45 degrees and 95 degrees.

6. The valve guide according to claim 1, wherein the shoulder edge comprises an angled corner between the axial surface and the shoulder surface having a shoulder angle therebetween, the shoulder angle being in a range between 70 degrees and 92.5 degrees.

7. The valve guide according to claim 1, wherein the axial surface comprises a first axial surface, and wherein the stem seal retention surface includes a second axial surface, the second axial surface including an outer radial portion, the second axial surface extending axially from the inner end of the shoulder surface toward the mounting end to the outer radial portion such that the outer radial portion is disposed radially outward of the inner end, the second axial surface including a third axial portion and a fourth axial portion with a second intermediate edge disposed therebetween, the third axial portion extending between the inner end of the shoulder and the second intermediate edge, and the fourth axial portion extending between the second intermediate edge and the outer radial portion, the third axial portion having a third axial slant angle relative to the radial plane, and the fourth axial portion having a fourth axial slant angle relative to the radial plane that is greater than the third axial slant angle.

8. The valve guide according to claim 7, wherein the third axial slant angle is greater than the first axial slant angle and less than the second axial slant angle.

9. The valve guide according to claim 8, wherein the first axial slant angle is in a second range between 40 and 75 degrees, and the axial surface includes an intermediate edge, the first axial portion extending axially from the face edge to the intermediate edge, and the second axial portion extending from the intermediate edge to the shoulder edge.

10. The valve guide according to claim 7, wherein the fourth axial slant angle is greater than the second axial slant angle.

11. The valve guide according to claim 10, wherein the stem seal retention surface includes a proximal seat surface, the proximal seat surface being annular and projecting radially outward from the second axial surface.

12. A cylinder head for an engine, the cylinder head comprising:
a cylinder head body, the cylinder head body defining a guide passage;
a valve guide, at least a portion of the valve guide disposed within the guide passage, the valve guide including a guide body with a mounting end and a seal end, the guide body being cylindrical and extending axially along a longitudinal axis between the mounting end and the seal end, the guide body including an inner surface and an outer surface, the inner surface defining a valve passage, wherein the outer surface includes a stem seal retention surface, the stem seal retention surface disposed at the seal end of the guide body, the stem seal retention surface including a distal face, an axial surface, and a shoulder surface,
the distal face being annular and projecting radially outward from the inner surface,
the axial surface having a face edge and a shoulder edge, the face edge adjacent the distal face, and the shoulder edge adjacent the shoulder surface, the axial surface extending axially from the face edge to the shoulder edge such that the shoulder edge is disposed radially outward of the face edge,
the shoulder surface including an inner end, the shoulder surface extending from the shoulder edge radially inwardly to the inner end such that the shoulder surface includes an engagement portion extending from the shoulder edge toward the inner end, the engagement portion having a shoulder slant angle relative to a radial plane perpendicular to the longitudinal axis, the shoulder slant angle being within fifteen degrees of the radial plane,
wherein the shoulder edge is disposed a radial edge distance from the inner surface of the guide body, and the engagement portion of the shoulder surface extends inwardly from the shoulder edge toward the inner surface over a radial rib engagement distance, and wherein a ratio of the radial rib engagement distance to the radial edge distance is at least 0.04, and
wherein the axial surface includes a first axial portion and a second axial portion, the first axial portion including the face edge, the second axial portion including the shoulder edge, the first axial portion having a first axial slant angle relative to the radial plane, the second axial portion having a second axial slant angle relative to the radial plane, the second axial slant angle being greater than the first axial slant angle, and wherein the second axial slant angle is in a range between greater than 75 and less than 90 degrees.

13. The cylinder head according to claim 12, the cylinder head body defining a fluid passage having a port in fluid communication therewith, the cylinder head further comprising:
a valve seat, the valve seat disposed within the port.

14. The cylinder head according to claim 13, wherein the shoulder edge of the valve guide comprises an angled corner between the axial surface and the shoulder surface having a shoulder angle therebetween, the shoulder angle being in a range between 45 degrees and 95 degrees, wherein the axial surface comprises a first axial surface, and wherein the stem seal retention surface includes a second axial surface, the second axial surface including an outer radial portion, the second axial surface extending axially from the inner end of the shoulder surface toward the mounting end to the outer radial portion such that the outer radial portion is disposed radially outward of the inner end, the second axial surface including a third axial portion and a fourth axial portion with a second intermediate edge disposed therebetween, the third axial portion extending between the inner end of the shoulder and the second intermediate edge, and the fourth axial portion extending between the second intermediate edge and the outer radial portion, the third axial portion having a third axial slant angle relative to the radial plane, and the fourth axial portion having a fourth axial slant angle relative to the radial plane that is greater than the third axial slant angle.

15. A valve assembly for an engine, the valve assembly comprising:
a valve, the valve including a tip, a stem, and a head, the stem extending axially along a longitudinal axis and interposed between the tip and the head;
a valve guide, the valve guide including a guide body with a mounting end and a seal end, the guide body being cylindrical and extending axially along the longitudinal axis between the mounting end and the seal end, the guide body including an inner surface and an outer surface, the inner surface defining a valve passage extending longitudinally between the seal end and the mounting end, and the outer surface includes a stem seal retention surface disposed at the seal end of the guide body, the stem of the valve extending through the valve passage such that the valve is reciprocally movable over a range of travel along the longitudinal axis with respect to the valve guide;

a seal, the seal being hollow and extending along the longitudinal axis, the seal including a mounting portion and a valve stem sealing portion, the mounting portion defining a valve guide cavity extending along the longitudinal axis and being retentively engaged with the stem seal retention surface of the valve guide such that the seal end of the valve guide is disposed within the valve guide cavity, the mounting portion including an annular retention rib projecting radially inwardly into the valve guide cavity, the valve stem sealing portion defining a valve stem passage extending along the longitudinal axis and in communication with the valve guide cavity, the stem of the valve extending through the valve stem passage such that the valve stem sealing portion is in sliding, sealing engagement therewith;

wherein the stem seal retention surface of the valve guide includes a distal face, an axial surface, and a shoulder surface, the distal face being annular and projecting radially outward from the inner surface of the valve guide, the axial surface having a face edge and a shoulder edge, the face edge adjacent the distal face, and the shoulder edge adjacent the shoulder surface, the axial surface extending axially from the face edge to the shoulder edge such that the shoulder edge is disposed radially outward of the face edge, the shoulder surface including an inner end, the shoulder surface extending from the shoulder edge radially inwardly to the inner end such that the shoulder surface includes an engagement portion extending from the shoulder edge toward the inner end, the engagement portion having a shoulder slant angle relative to a radial plane perpendicular to the longitudinal axis, the shoulder slant angle being within fifteen degrees of the radial plane, the engagement portion in retentive, interfering relationship with the annular retention rib of the seal, wherein the shoulder edge is disposed a radial edge distance from the inner surface of the guide body, and the engagement portion of the shoulder surface extends inwardly from the shoulder edge toward the inner surface over a radial rib engagement distance, and wherein a ratio of the radial rib engagement distance to the radial edge distance is at least 0.04, and wherein the axial surface includes a first axial portion and a second axial portion, the first axial portion including the face edge, the second axial portion including the shoulder edge, the first axial portion having a first axial slant angle relative to the radial plane, the second axial portion having a second axial slant angle relative to the radial plane, the second axial slant angle being greater than the first axial slant angle, and wherein the second axial slant angle is in a range between greater than 75 and less than 90 degrees;

wherein the seal has an axial seal length measured along the longitudinal axis, the valve guide has a valve guide diameter, and a ratio of the axial seal length to the valve guide diameter is less than 1.

16. The valve assembly according to claim 15, wherein the seal comprises a double gas lip seal.

17. The valve assembly according to claim 15, wherein the shoulder edge is disposed at a radial position, the engagement portion of the shoulder surface extends inwardly from the shoulder edge toward the inner surface over a radial engagement distance, and wherein the annular retention rib, in an uncompressed condition, extends radially inwardly beyond the radial position by a retention distance at least twice as great as the radial engagement distance.

18. The valve assembly according to claim 15, wherein the seal has an axial seal length, the valve guide has a valve guide diameter, and a ratio of the axial seal length to the valve guide diameter is less than 1.

19. The valve assembly according to claim 15, further comprising:

a valve spring, the valve spring mounted to the tip of the valve, the valve spring configured to bias the valve relative to the valve guide to a closed position.

* * * * *